(12) United States Patent
Barkley et al.

(10) Patent No.: US 9,906,137 B2
(45) Date of Patent: Feb. 27, 2018

(54) HIGH POWER DENSITY, HIGH EFFICIENCY POWER ELECTRONIC CONVERTER

(71) Applicant: Cree, Inc., Durham, NC (US)

(72) Inventors: Adam Barkley, Raleigh, NC (US); XueChao Liu, Kowloon (HK); Marcelo Schupbach, Raleigh, NC (US)

(73) Assignee: Cree, Inc., Durham, NC (US)

( * ) Notice: Subject to any disclaimer, the term of this patent is extended or adjusted under 35 U.S.C. 154(b) by 0 days.

(21) Appl. No.: 14/493,494

(22) Filed: Sep. 23, 2014

(65) Prior Publication Data

US 2016/0087537 A1   Mar. 24, 2016

(51) Int. Cl.
  *H02M 3/335*   (2006.01)

(52) U.S. Cl.
  CPC ............................ *H02M 3/33507* (2013.01)

(58) Field of Classification Search
  CPC ............ H02M 3/33507; H05B 41/28; H05B 33/0815; H05B 37/029
  USPC ........................................ 363/21.12; 315/247
  See application file for complete search history.

(56) References Cited

U.S. PATENT DOCUMENTS

| | | | | |
|---|---|---|---|---|
| 8,471,488 | B1 * | 6/2013 | Hopkins | H02M 1/4258 315/247 |
| 2002/0021575 | A1 * | 2/2002 | Yasumura | H02M 3/33569 363/21.04 |
| 2008/0238363 | A1 * | 10/2008 | Bourilkov | H02J 7/0073 320/107 |
| 2012/0182769 | A1 * | 7/2012 | Yonezawa | H02M 1/34 363/21.12 |
| 2012/0293087 | A1 * | 11/2012 | Matsuda | H05B 33/0815 315/219 |
| 2013/0069582 | A1 * | 3/2013 | Kimoto | H02M 3/33592 320/101 |
| 2013/0188407 | A1 * | 7/2013 | Uguen | H05B 33/0815 363/126 |
| 2014/0268564 | A1 * | 9/2014 | Sagneri | H05K 7/209 361/692 |
| 2014/0362613 | A1 * | 12/2014 | Park | H02M 1/34 363/21.16 |

(Continued)

FOREIGN PATENT DOCUMENTS

CN       104883064 A  *  9/2015  .......... H02M 1/4266

OTHER PUBLICATIONS

David Leadley, Electronic band structure, Thu Jul. 15, 2010, pp. 1-8.*

(Continued)

*Primary Examiner* — Alex Torres-Rivera
(74) *Attorney, Agent, or Firm* — Anthony J. Josephson

(57) ABSTRACT

AC to DC power electronic converter circuitry includes isolated converter circuitry and control circuitry coupled to the isolated converter circuitry. The isolated converter circuitry includes one or more wide bandgap switching components. The control circuitry is configured to drive at least one of the wide bandgap switching components such that the power electronic converter circuitry is configured to generate a DC output with an output power greater than 100W at an efficiency greater than 92%. Using wide bandgap components in the isolated converter circuitry allows the power electronic converter circuitry to achieve a high efficiency and high power density.

20 Claims, 8 Drawing Sheets

(56) References Cited

U.S. PATENT DOCUMENTS

| | | | |
|---|---|---|---|
| 2015/0244273 A1* | 8/2015 | Schaemann | H05B 33/0815 363/21.18 |
| 2015/0249397 A1* | 9/2015 | Ogasawara | H02M 1/4266 315/200 R |
| 2015/0334800 A1* | 11/2015 | Fawaz | H05B 33/0812 315/294 |

OTHER PUBLICATIONS

B. Van Zeghbroeck, Principles of Semiconductor Devices, 2011, pp. 1-16.*

Author Unknown, "60 W, high power-factor flyback LED driver based on the L6562AT and TSM101," STEVAL-ILL042V2 Data Brief, Sep. 30, 2013, STMicroelectronics, 4 pages.

Author Unknown, "STEVAL-ILL042V1: high power factor flyback LED driver based on the L6562A and TSM101," AN3424 Application note, Nov. 8, 2011, STMicroelectronics, 22 pages.

* cited by examiner

HIGH POWER DENSITY, HIGH EFFICIENCY POWER ELECTRONIC CONVERTER

FIELD OF THE DISCLOSURE

The present disclosure relates to power electronic converter devices. Specifically, the present disclosure relates to high efficiency and high power density alternating current (AC) to direct current (DC) power electronic converter circuitry.

BACKGROUND

To support the vast number of electronic devices used today, power electronic converters are nearly ubiquitous. Currently, power electronic converters are used in applications ranging from consumer electronic devices to light emitting diode (LED) lighting fixtures. As electronic devices continue to advance, the demands placed on their power electronic converters become increasingly stringent. For example, modern electronic devices require power electronic converters with minimal noise and tight voltage and/or current regulation. In an effort to meet these stringent demands, power electronic converters often include multiple stages to meet the regulation requirements of the electronic device they are associated with. While generally effective at providing a desired output voltage and/or current from a given input signal, multi-stage power electronic converters are complex, requiring a large number of components that consume both volume and power, thereby reducing the density and efficiency of the power electronic converter.

In a further effort to meet the stringent density and cost demands placed upon them, many power electronic converters have moved from isolated architectures such as flyback converters and half-bridge converters to simpler non-isolated architectures such as boost converters, buck converters, and other basic topologies. While non-isolated electronic power converters may improve the efficiency of power conversion, such an improvement comes at the cost of reduced safety margin and increased susceptibility to incoming voltage surges such as those occurring from a lightning strike. Accordingly, there is a need for isolated power electronic converter circuitry with a single DC to DC converter stage that is highly efficient, compact, inexpensive, and capable of providing a tightly regulated output.

Conventional power electronic converters employ silicon (Si) switching devices to transfer power from one element to another. While silicon (Si) devices have been proven effective for many conversion applications, the limitations of these devices are well known. For example, silicon (Si) devices have relatively high conduction loss, slow switching speed, and high switching energy losses for a given die area and blocking voltage. As a result, silicon (Si) switching devices are limited in use to relatively low switching frequency and low power density power electronic converter systems. Accordingly, there is a need for power electronic converter circuitry utilizing high performance wide bandgap (WBG) semiconductor switching devices in these stringent power electronic applications.

SUMMARY

The present disclosure relates to high efficiency and high power density alternating current (AC) to direct current (DC) power electronic converter circuitry. In one embodiment, AC to DC power electronic converter circuitry includes isolated converter circuitry and control circuitry coupled to the isolated converter circuitry. The isolated converter circuitry includes one or more wide bandgap switching components. The control circuitry is configured to drive at least one of the wide bandgap switching components such that the power electronic converter circuitry is configured to generate a constant DC output with an output power greater than 100 W at an efficiency greater than 92% and a power density greater than 13 W/in$^3$. Using wide bandgap components in the isolated converter circuitry allows the power electronic converter circuitry to achieve a high output power, high efficiency, and high power density.

In one embodiment, the one or more wide bandgap switching components are silicon carbide (SiC) components. In particular, one or more of the wide bandgap switching components may be a silicon carbide (SiC) metal-oxide semiconductor field-effect transistor (MOSFET).

In one embodiment, the isolated converter circuitry includes only a single DC to DC converter stage. Using a single-stage converter significantly simplifies the design and operation of the power electronic converter circuitry.

In one embodiment, the isolated converter circuitry is a flyback converter.

In one embodiment, a solid-state lighting fixture includes a light source and AC to DC power electronic converter circuitry. The light source includes at least one light emitting diode (LED). The AC to DC power electronic converter circuitry includes isolated converter circuitry and control circuitry coupled to the isolated converter circuitry. The isolated converter circuitry includes one or more wide bandgap switching components. The control circuitry is configured to drive at least one of the wide bandgap switching components such that the power electronic converter circuitry is configured to generate a constant DC output with an output power greater than 100 W at an efficiency greater than 92% and a power density greater than 13 W/in$^3$. Using wide bandgap components in the isolated converter circuitry allows the power electronic converter circuitry to achieve a high efficiency and high power density.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1:
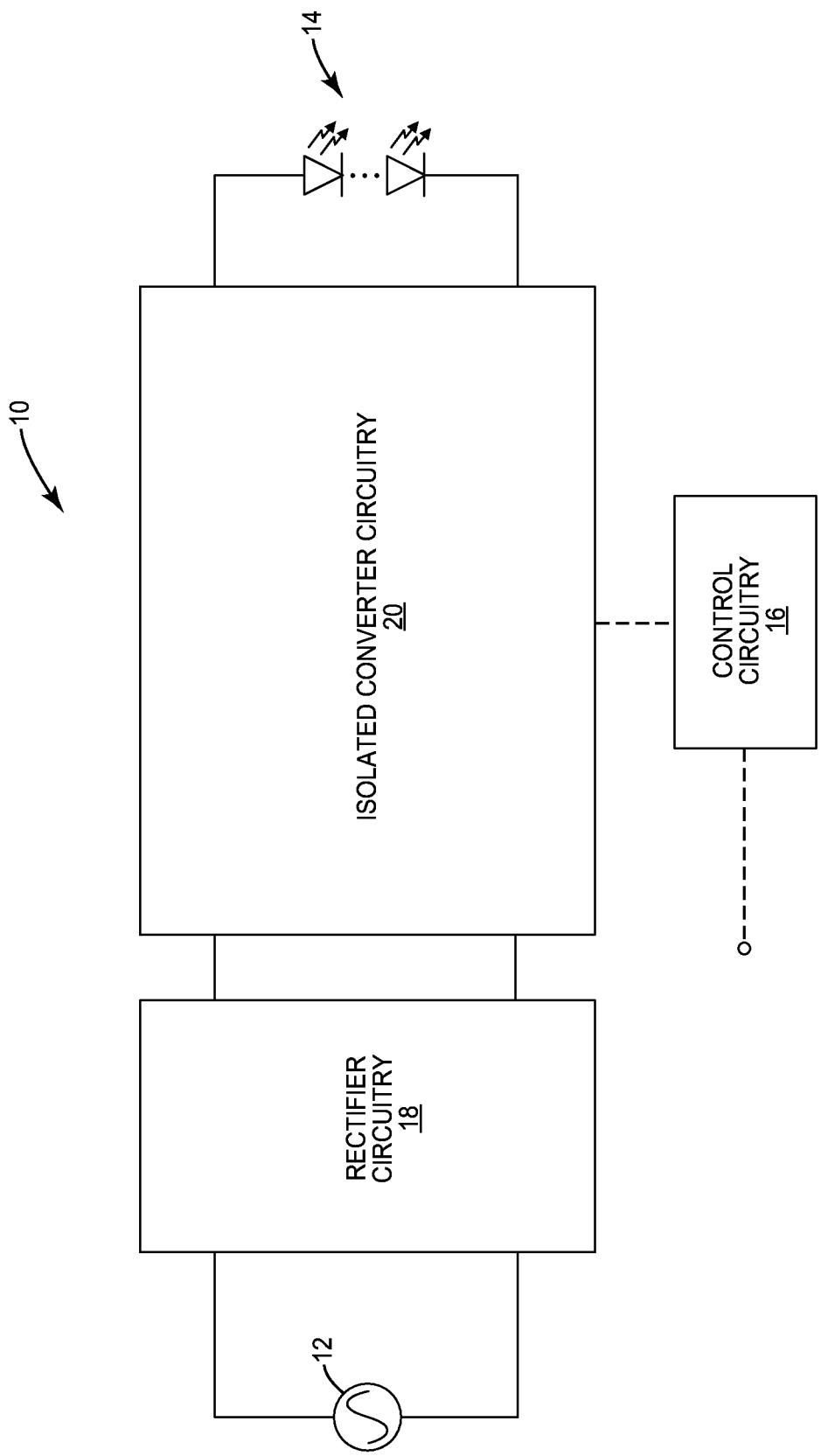
FIG. 1 is a block diagram illustrating a power electronic converter according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 shows power electronic converter circuitry 10 according to one embodiment of the present disclosure. For context, an alternating current (AC) power source 12, an LED light source 14, and control circuitry 16 are also shown. The power electronic converter circuitry 10 includes rectifier circuitry 18 and isolated converter circuitry 20. The rectifier circuitry 18 is configured to receive and rectify an AC input signal from the AC power source 12. The isolated converter circuitry 20 is configured to receive a rectified output signal from the rectifier circuitry 18 and regulate the voltage, current, or both, of the rectified output signal to generate a regulated output signal, which is used, for example, to drive the LED light source 14. As defined herein, isolated converter circuitry is converter circuitry in which a direct current (DC) path does not exist between an input and an output of the converter circuitry. The control circuitry 16 generates one or more control signals for controlling operation of the isolated converter circuitry 20. As discussed in further detail below, the isolated converter circuitry 20 includes one or more wide bandgap semiconductor components that allow the isolated converter circuitry 20 and thus the power electronic converter circuitry 10 to produce an output power greater than 100 W at an efficiency greater than 92% given a root mean square (RMS) AC input voltage between 120 V and 277 V. Further, using wide bandgap semiconductor devices in the isolated converter circuitry 20 allows the power electronic converter circuitry 10 to achieve a power density between about 8 W/in$^3$ and 20 W/in$^3$, a power factor greater than about 0.9, and a total harmonic distortion (THD) less than about 15%.

In one embodiment, the rectifier circuitry 18 is a bridge rectifier, and the isolated converter circuitry 20 is a flyback converter, however, any suitable rectifier circuitry 18 and isolated converter circuitry 20 may be used without departing from the principles of the present disclosure. The wide bandgap semiconductor components may be silicon carbide (SiC), gallium nitride (GaN), or the like. Further, the wide bandgap semiconductor components are switching components such as transistors, diodes, or the like. As defined herein, "switching devices" include diodes and other solid-state switching devices configured to selectively provide power to a load. Notably, the power electronic converter circuitry 10 includes only a single DC to DC converter stage. Accordingly, the design and operation of the power electronic converter circuitry 10 is simplified compared to conventional approaches, while providing superior performance due to the use of wide bandgap semiconductor components therein.

Figure 2:
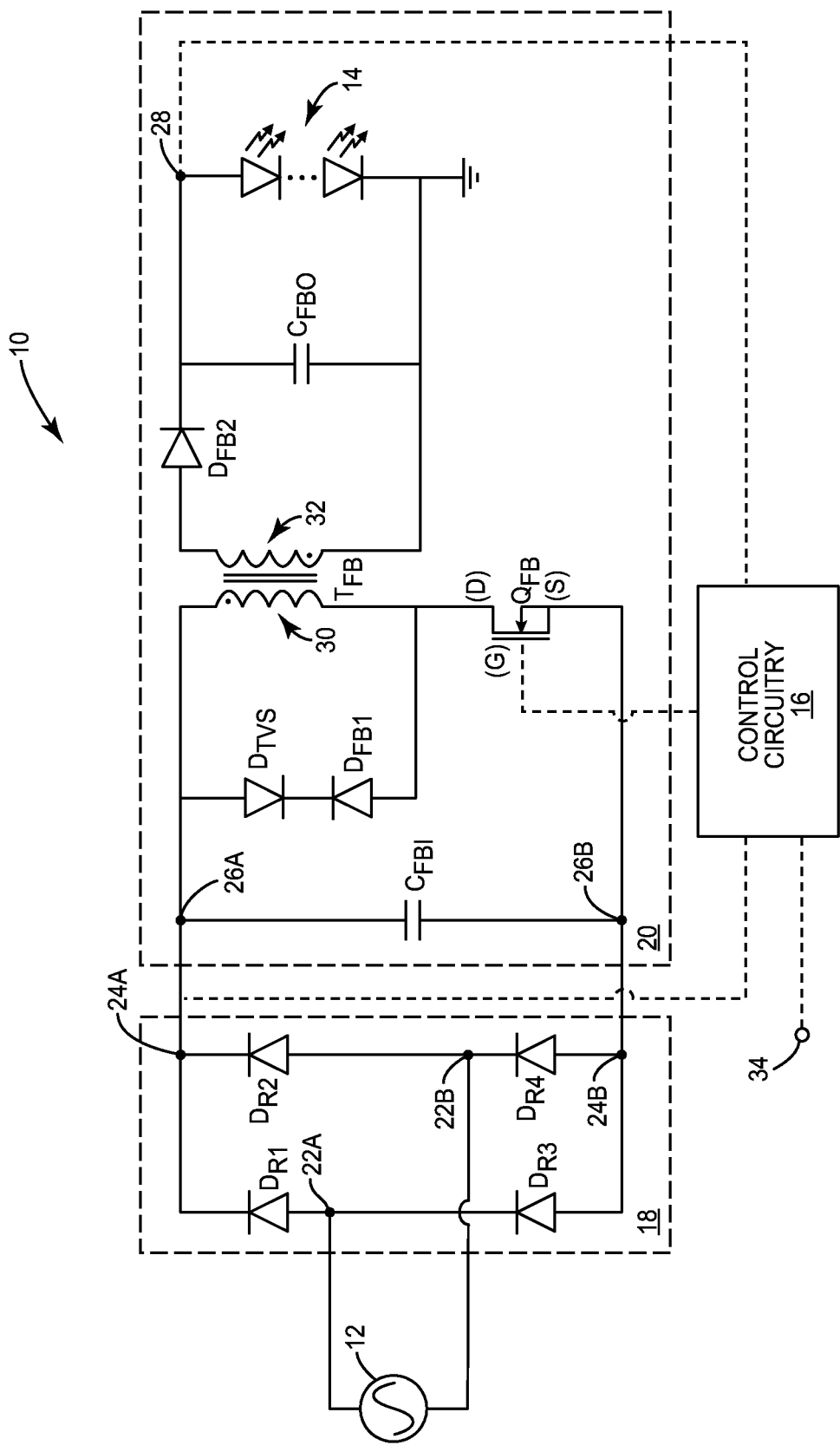
FIG. 2 is a schematic illustrating details of the power electronic converter shown in FIG. 1 according to one embodiment of the present disclosure.
Figure 3:
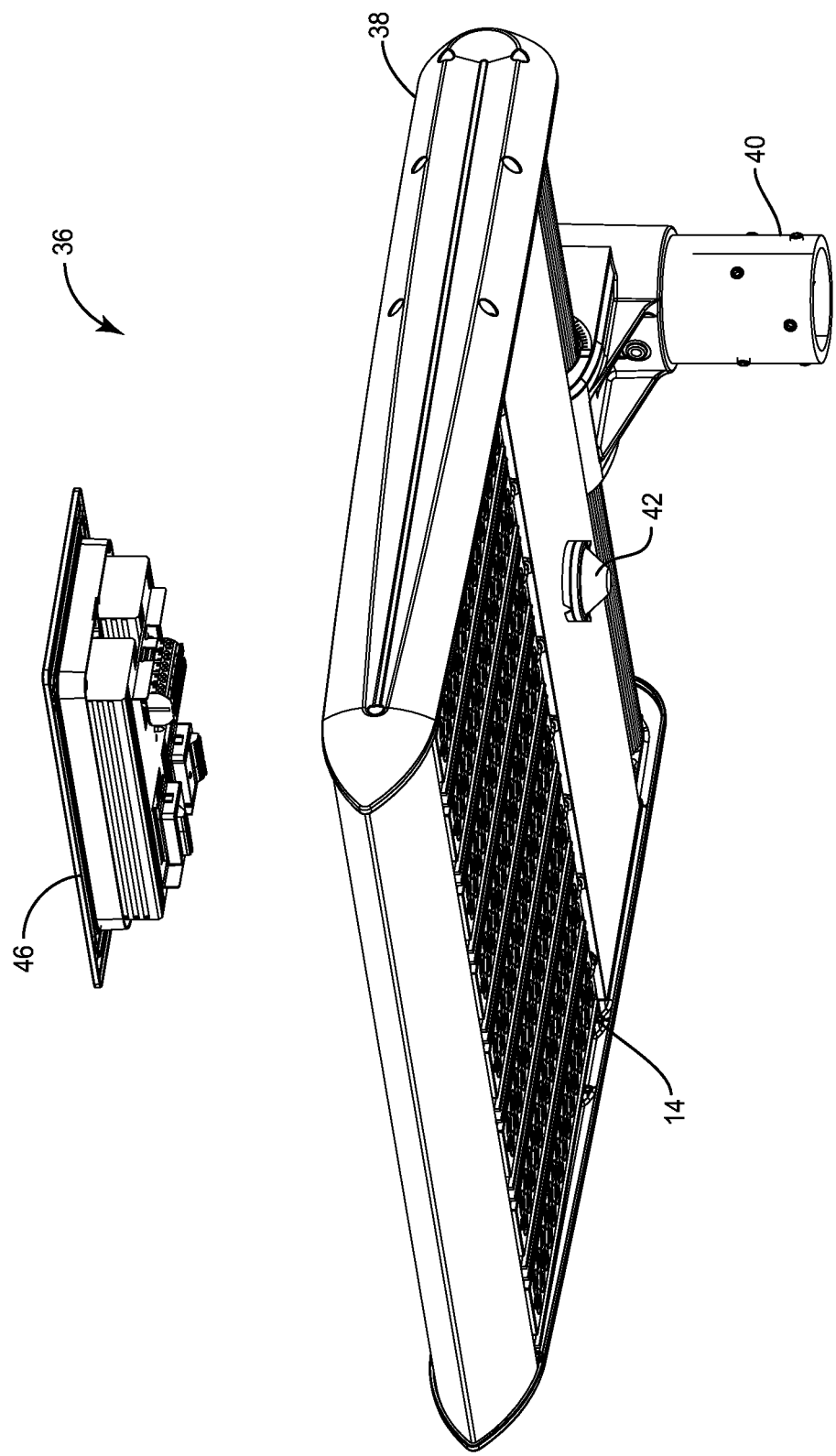
FIG. 3 illustrates a solid-state lighting fixture that may be used in association with the power electronic converter shown in FIGS. 1 and 2 according to one embodiment of the present disclosure.
Figure 4:
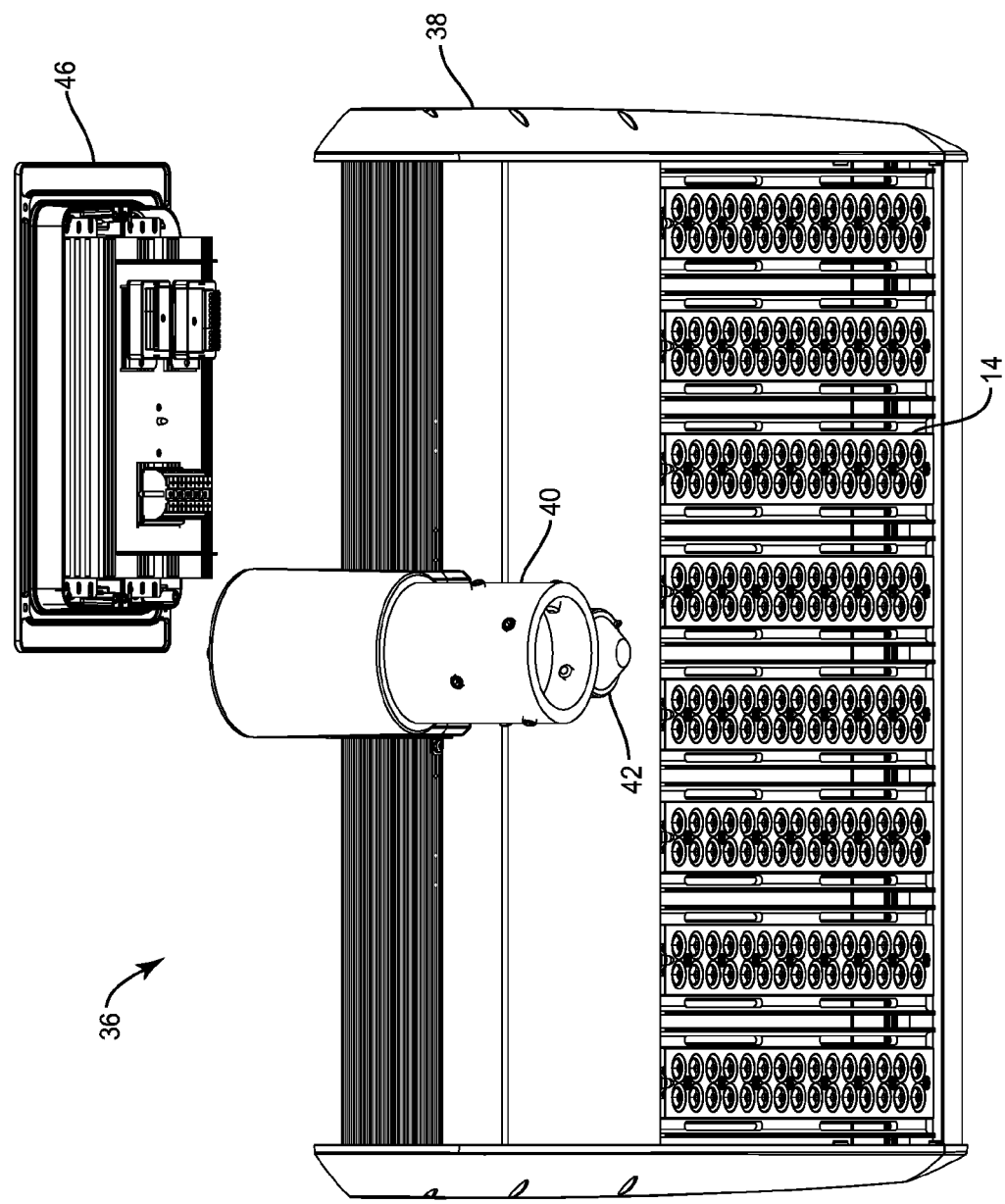
FIG. 4 illustrates further details of the solid-state lighting fixture shown in FIG. 3.
Figure 5:
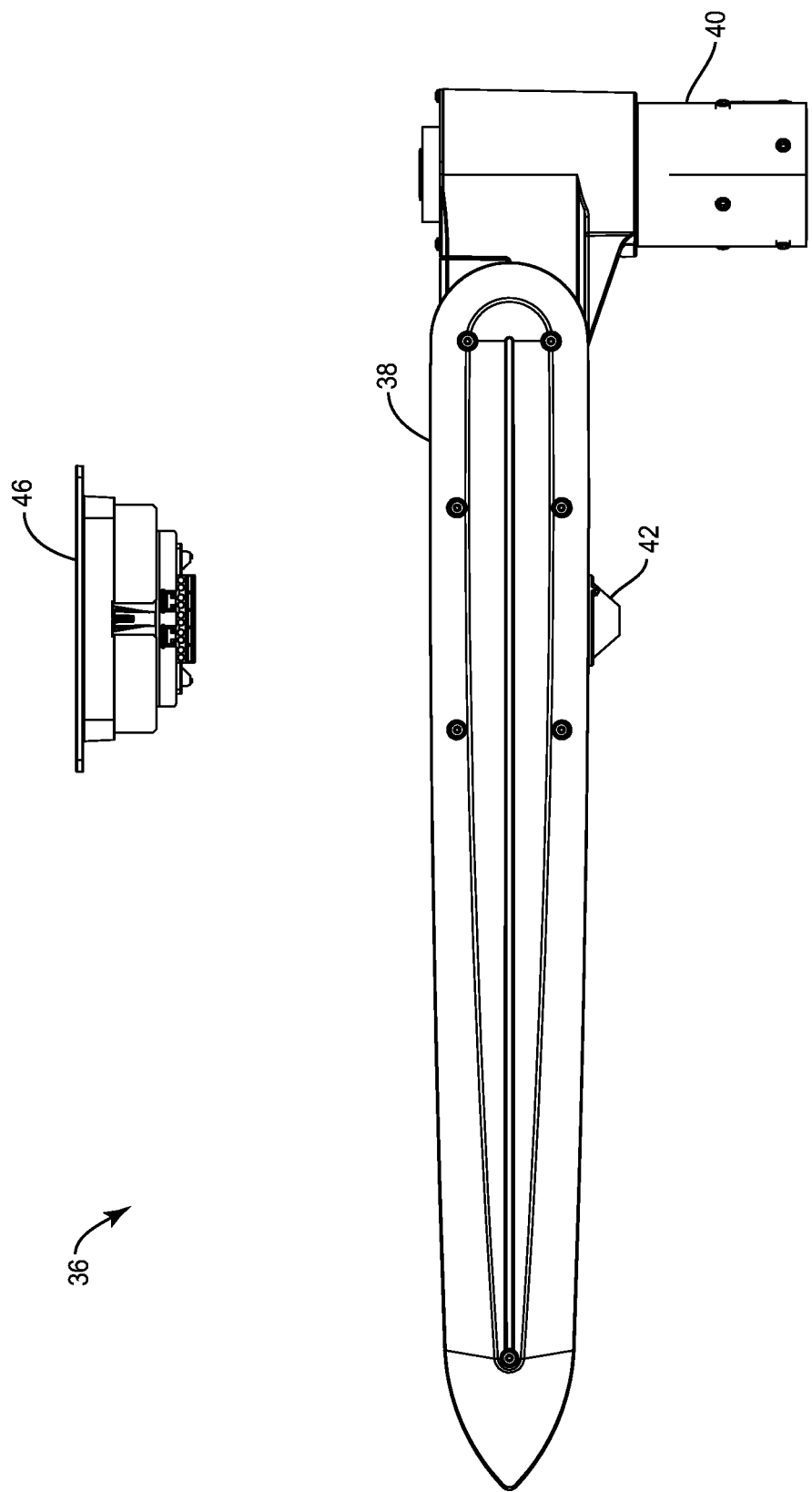
FIG. 5 illustrates further details of the solid-state lighting fixture shown in FIGS. 3 and 4.
Figure 6:
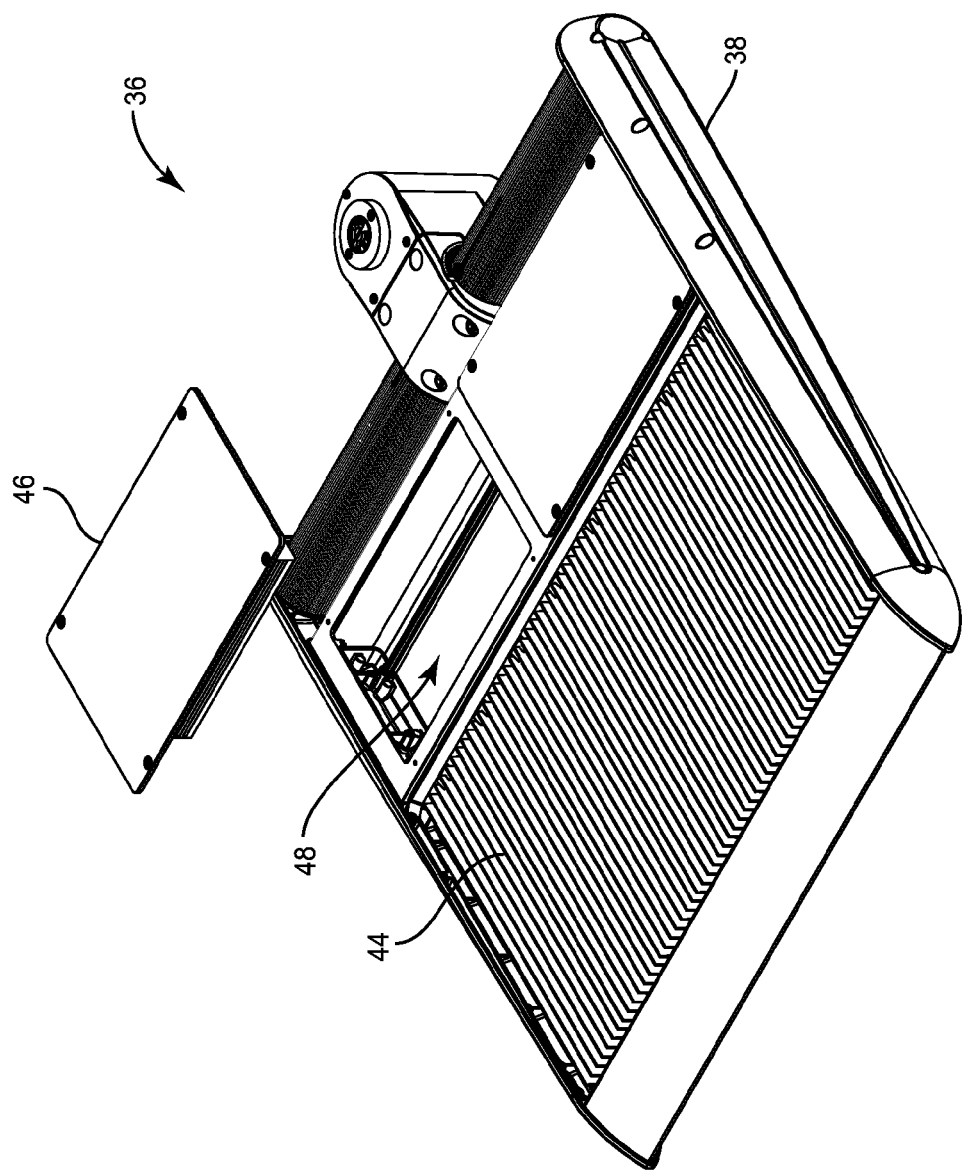
FIG. 6 illustrates further details of the solid-state lighting fixture shown in FIGS. 3-5.

FIG. 2 shows details of the power electronic converter circuitry 10 according to one embodiment of the present disclosure. As shown in FIG. 2, the rectifier circuitry 18 is a bridge rectifier including a first rectifier input node 22A, a second rectifier input node 22B, a first rectifier output node 24A, a second rectifier output node 24B, a first rectifier diode $D_{R1}$, a second rectifier diode $D_{R2}$, a third rectifier diode $D_{R3}$, and a fourth rectifier diode $D_{R4}$. The first rectifier diode $D_{R1}$ includes an anode coupled to the first rectifier input node 22A and a cathode coupled to the first rectifier output node 24A. The second rectifier diode $D_{R2}$ includes an anode coupled to the second rectifier input node 22B and a cathode coupled to the first rectifier output node 24A. The third rectifier diode $D_{R3}$ includes an anode coupled to the second rectifier output node 24B and a cathode coupled to the first rectifier input node 22A. The fourth rectifier diode $D_{R4}$ includes an anode coupled to the second rectifier output node 24B and a cathode coupled to the second rectifier input node 22B. The first rectifier input node 22A is coupled to a positive output of the AC power source 12, which may be filtered via an electromagnetic interference (EMI) filter (not shown). The second rectifier input node 22B may be coupled to a negative output of the AC power source 12, which may also be filtered by the EMI filter (not shown).

The isolated converter circuitry 20 is a flyback converter including a first flyback input node 26A, a second flyback input node 26B, a flyback output node 28, a flyback transformer $T_{FB}$, a flyback switch $Q_{FB}$, a first flyback diode $D_{FB1}$, a second flyback diode $D_{FB2}$, a flyback transient voltage suppression diode $D_{TVS}$, a flyback input capacitor $C_{FBI}$, and a flyback output capacitor $C_{FBO}$. The first flyback input node 26A is coupled to the first rectifier output node 24A. Further, the second flyback input node 26B is coupled to the second rectifier output node 24B. The flyback transformer $T_{FB}$ includes a primary winding 30 coupled between the first flyback input node 26A and the flyback switch $Q_{FB}$. The flyback switch $Q_{FB}$ is coupled between the primary winding 30 of the flyback transformer $T_{FB}$ and the second flyback input node 26B. The flyback transient voltage suppression diode $D_{TVS}$ includes an anode coupled to the first flyback input node 26A and a cathode coupled to an anode of the first flyback diode $D_{FB1}$. Further, the first flyback diode $D_{FB1}$ includes a cathode coupled between the primary winding 30 of the flyback transformer $T_{FB}$ and the flyback switch $Q_{FB}$. The flyback input capacitor $C_{FBI}$ is coupled between the first flyback input node 26A and the second flyback input node 26B.

The flyback transformer $T_{FB}$ further includes a secondary winding 32 coupled in series with the second flyback diode $D_{FB2}$ between the flyback output node 28 and ground, such that a cathode of the second flyback diode $D_{FB2}$ is coupled to the flyback output node 28 and an anode of the second flyback diode $D_{FB2}$ is coupled to the secondary winding 32 of the flyback transformer $T_{FB}$, which is in turn coupled to ground. Finally, the flyback output capacitor $C_{FBO}$ is coupled between the flyback output node 28 and ground. The LED light source 14 is coupled between the flyback output node 28 and ground. The control circuitry 16 is coupled to the second flyback input node 26B, a control input 34, the flyback switch $Q_{FB}$, and the flyback output node 28.

In operation, an EMI-filtered AC power supply signal is received from the AC power source 12 at the rectifier circuitry 18. The rectifier circuitry 18 rectifies the AC power supply signal to generate a rectified output signal, which is delivered to the isolated converter circuitry 20. The isolated converter circuitry 20 regulates the voltage, current, or both, of the rectified output signal to generate a regulated output signal, which may be used to drive the LED light source 14. Specifically, the control circuitry 16 modulates a flyback control signal delivered to the flyback switch $Q_{FB}$ to generate a regulated output signal at a desired voltage and/or current.

When the flyback switch $Q_{FB}$ is closed, the primary winding 30 of the transformer is directly connected to the rectified AC signal appearing at flyback input nodes 26A and 26B. Accordingly, the current through the primary winding 30 and therefore the magnetic flux of the primary winding 30 increase, storing energy in the transformer. Although a voltage induced in the secondary winding 32 of the flyback transformer $T_{FB}$, the induced voltage is negative due to the opposite polarity of the primary winding 30 and the secondary winding 32. Accordingly, the second flyback diode $D_{FB2}$ is reverse biased, thereby blocking voltage from the secondary winding 32 of the flyback transformer $T_{FB}$ from reaching the flyback output capacitor $C_{FBO}$ and the LED light source 14. However, due to a positive charge stored on the flyback output capacitor $C_{FBO}$ from a previous charging cycle of the isolated converter circuitry 20, the flyback output capacitor $C_{FBO}$ continues supplying energy to the LED light source 14.

When the flyback switch $Q_{FB}$ is opened, the current through the primary winding 30 of the flyback transformer $T_{FB}$ and thus the magnetic flux of the primary winding 30 decrease. At this point, the induced voltage in the secondary winding 32 of the flyback transformer $T_{FB}$ is positive. Accordingly, the second flyback diode $D_{FB2}$ is forward biased, such that the secondary winding 32 of the flyback transformer $T_{FB}$ supplies energy to both the flyback output capacitor $C_{FBO}$ and the LED light source 14.

The control circuitry 16 monitors the voltage at the first flyback input node 26A and the flyback output node 28 to determine the frequency at which to switch the flyback switch $Q_{FB}$ on and off. Different switching algorithms may be implemented by the control circuitry 16, for example, boundary conduction mode (also called critical conduction mode) control, valley switching mode control, discontinuous conduction mode control, and continuous conduction mode control, without departing from the principles of the present disclosure. The control circuitry 16 may additionally monitor the input sinusoid voltage to the power electronic converter circuitry 10 in order to provide power factor correction by aligning the phase of the input voltage and input current. Further, the control circuitry 16 includes an additional control input 34 for receiving a control signal from an external source. The control circuitry 16 may use the control signal received at the additional control input 34 to modify the modulation of the control signal delivered to the flyback switch $Q_{FB}$ and thus the voltage and/or current level of the regulated output signal produced by the isolated converter circuitry 20. In one embodiment, the control signal is a dimming control signal, for example, from an analog dimming control source. In such an embodiment, the dimming control signal controls the current flowing through the LED light source 14, thereby controlling the amount of light emitted therefrom. In one embodiment, the control circuitry 16 may include one or more sub-systems such as gate drive circuitry used to drive a gate contact of the flyback switch $Q_{FB}$.

In one embodiment, the flyback switch $Q_{FB}$, the first flyback diode $D_{FB1}$, and the second flyback diode $D_{FB2}$ are wide bandgap semiconductor devices. For example, the flyback switch $Q_{FB}$ may be a silicon carbide (SiC) metal-oxide-semiconductor field-effect transistor (MOSFET) including a gate contact (G) coupled to the control circuitry 16, a drain contact (D) coupled to the primary winding 30 of the flyback transformer $T_{FB}$, and a source contact (S) coupled to the second rectifier output node 24B. In an additional embodiment, the flyback switch $Q_{FB}$ is a gallium nitride (GaN) high electron mobility transistor (HEMT). In other embodiments, the flyback switch $Q_{FB}$ may be any suitable switching element, for example, a bipolar junction transistor (BJT), a field-effect transistor (FET), or the like. Further, the flyback switch $Q_{FB}$ may be manufactured from any suitable wide bandgap material system, such as gallium arsenide (GaAs) or the like. The first flyback diode $D_{FB1}$ and the second flyback diode $D_{FB2}$ may be silicon carbide (SiC) Schottky diodes. In other embodiments, the first flyback diode $D_{FB1}$ and the second flyback diode $D_{FB2}$ may be any suitable element, such as PiN diodes, P-N diodes, or the like. Further, the first flyback diode $D_{FB1}$ and the second flyback diode $D_{FB2}$ may be manufactured from any suitable wide bandgap material system, such as gallium nitride (GaN) or the like. In other various embodiments, any one of the switching components in the isolated converter circuitry 20 may be wide bandgap semiconductor components, for example, the flyback transient voltage suppression diode $D_{TVS}$ may also be a wide bandgap semiconductor component without departing from the principles described herein.

Using wide bandgap switching components in the isolated converter circuitry 20 allows the power electronic converter circuitry 10 to perform much better than its conventional counterparts. For example, using wide bandgap switching components in the isolated converter circuitry 20 allows the power electronic converter circuitry 10 to produce an output power greater than 100 W at an efficiency greater than 92% given an AC input voltage between 120 V and 277 V. Further, using wide bandgap switching components in the isolated converter circuitry 20 allows the power electronic converter circuitry 10 to achieve a power density between about 8 W/in 3 and 20 W/in 3, a power factor greater than about 0.9, and a total harmonic distortion (THD) less than about 15%. Finally, the use of wide bandgap switching components in the power electronic converter circuitry 10 allows the control circuitry 16 to drive the power electronic converter circuitry 10 at a much higher frequency than conventional devices, thereby enabling the power electronic converter circuitry 10 to achieve higher power densities than were previously unattainable. Achieving such performance improvements for an isolated power electronic converter with only one DC to DC converter stage is highly beneficial, as the resulting power electronic converter circuitry 10 is simple, compact, and capable of saving power, while providing a tightly regulated output voltage and/or current for powering various electronic devices.

FIGS. 3 through 6 show an exemplary lighting fixture 36 incorporating the power electronic converter circuitry 10 according to one embodiment of the present disclosure. The lighting fixture 36 includes an outer housing 38, a mounting apparatus 40, an occupancy module housing 42, and a heatsink 44. The power electronic converter circuitry 10 is located within a driver circuitry module 46, which is inserted into a top cavity 48 located in the top of the outer housing 38 of the lighting fixture 36. Notably, the power electronic converter circuitry 10 described herein may be retro-fitted into a pre-existing lighting fixture 36, such as the Edge High Output series lighting fixtures manufactured by Cree, Inc. of Durham, N.C. The outer housing 38 of the lighting fixture 36 may include more than one top cavity 48 in order to accept a number of driver circuitry modules 46. However, since the power electronic converter circuitry 10 discussed above utilizes wide bandgap switching components, the power handling capability of multiple driver circuitry modules 46 may be accomplished by a single driver circuitry module 46, thereby saving not only space in the lighting fixture 36, but also expense. In many applications, the added expense of the wide bandgap switching components utilized in the power electronic converter circuitry 10 is more than compensated for by the reduction in the overall number of components in the driver circuitry module 46. The occupancy module housing 42 may be mounted on a bottom surface of the lighting fixture 36 alongside the LED light source 14. The LED light source 14 may be mounted such that the LEDs are thermally coupled to the heatsink 44, which may include a plurality of fins configured to disperse heat away from the LED light source 14 towards the top of the lighting fixture 36.

Figure 7:
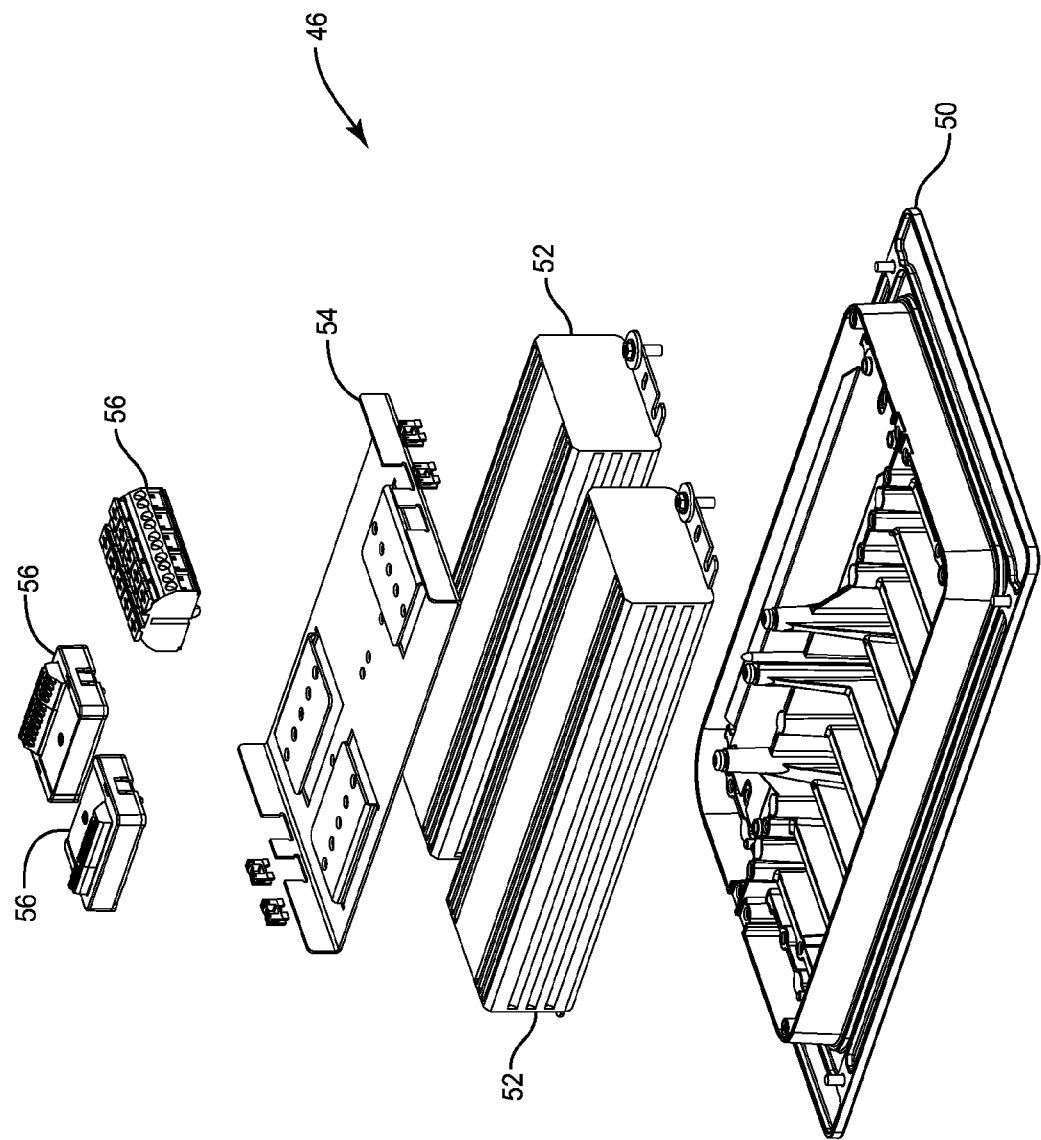
FIGS. 7 and 8 are illustrations of driver circuitry enclosure for the power electronic converter shown in FIGS. 1 and 2 according to one embodiment of the present disclosure.
Figure 8:
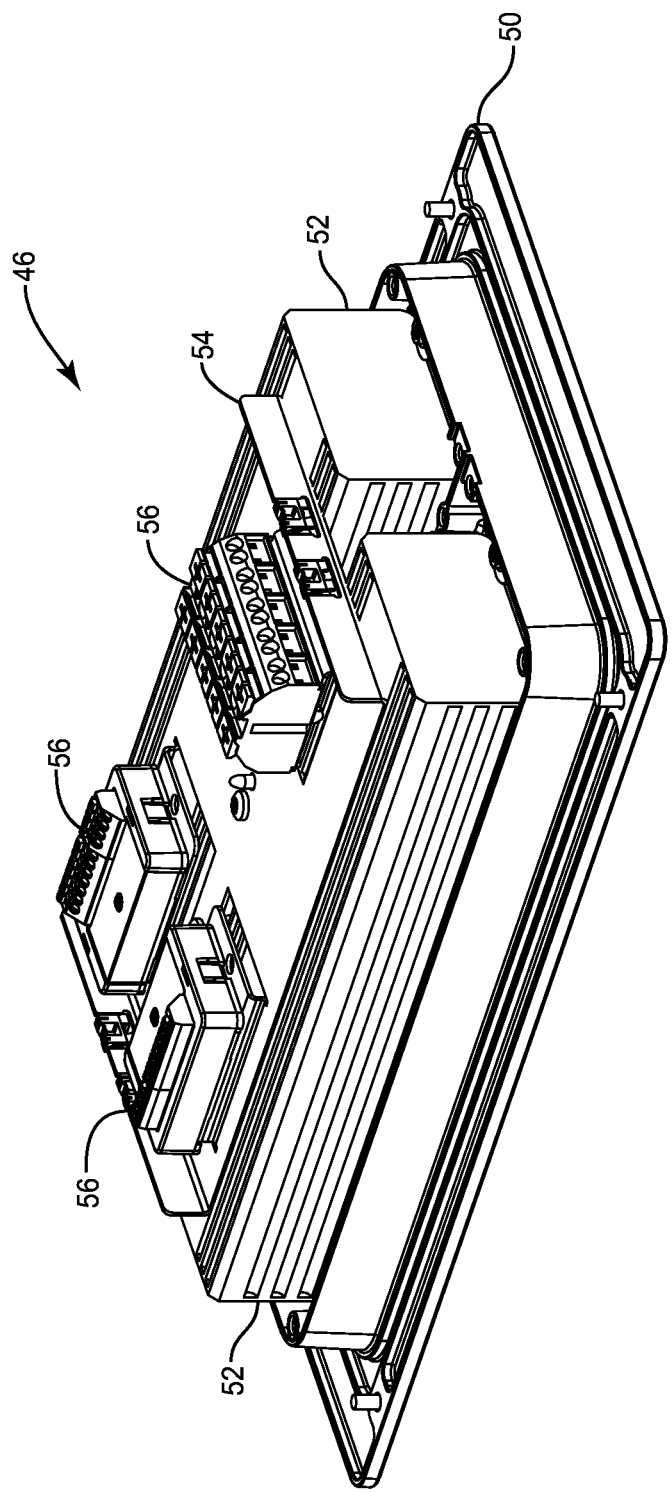

FIGS. 7 and 8 show details of the driver circuitry module 46 according to one embodiment of the present disclosure. The driver circuitry module 46 includes a mounting plate 50, a number of driver circuitry enclosures 52, a contact substrate 54, and a number of electrical contacts 56. The driver circuitry enclosures 52 may each include the power electronic converter circuitry 10 shown above with respect to FIGS. 1 and 2. Each one of the driver circuitry enclosures 52 may be thermally coupled to the power electronic converter circuitry 10 therein in order to provide adequate heat dissipation and ensure the longevity of the power electronic converter circuitry 10, and further may be coupled to the mounting plate 50. The contact substrate 54 may be mounted on top of the driver circuitry enclosures 52 such that the necessary electrical interconnects between the power electronic converter circuitry 10 and the contact substrate 54 are made. Finally, the electrical contacts 56 may be mounted on the contact substrate 54 such that the desired contacts to the power electronic converter circuitry 10 are made available for use by the lighting fixture 36.

The dimensions of the driver circuitry enclosures 52 are defined by a $L_H$, a width $W_H$, and a height $H_H$. In one exemplary embodiment, the length $L_H$ of each one of the driver circuitry enclosures 52 is between 6" and 6.5", the width $W_H$ of each one of the driver circuitry enclosures 52 is between 2" and 2.25", and the height $H_H$ of each one of the driver circuitry enclosures 52 is between 1.5" and 1.75". As discussed herein, the power density of the power electronic converter circuitry 10 is defined as the output power delivered by the power electronic converter circuitry 10 divided by the enclosed volume of the driver circuitry enclosure 48 in which the power electronic converter circuitry 10 is located. In one embodiment, the power output of the power electronic converter circuitry 10 is between 200 W and 250 W, such that the power density of the power electronic converter circuitry 10 is between 8 W/in$^3$ and 20 W/in$^3$. The high power density of the power electronic converter circuitry 10 due to the use of wide bandgap switching devices results in improvements in the output capabilities of the power electronic converter circuitry 10 without consuming additional volume over conventional devices.

Those skilled in the art will recognize improvements and modifications to the preferred embodiments of the present disclosure. All such improvements and modifications are considered within the scope of the concepts disclosed herein and the claims that follow.

What is claimed is:
1. An alternating current (AC) to direct current (DC) power electronic converter circuitry comprising:
an isolated converter circuitry including one or more wide bandgap switching components; and
a control circuitry coupled to the isolated converter circuitry and configured to drive at least one of the one or more wide bandgap switching components such that the AC to DC power electronic converter circuitry is configured to generate a DC output for driving one or more light emitting diodes (LEDs), wherein such that the DC output provides an output power greater than 100 W at an efficiency greater than 92% and a power density between 8 W/in$^3$ and 20 W/in$^3$;

wherein the power density is a function of the output power divided by a volume of an enclosure of the AC to DC power electronic converter circuitry.

2. The AC to DC power electronic converter circuitry of claim 1, wherein the one or more wide bandgap switching components are silicon carbide (SiC) components.

3. The AC to DC power electronic converter circuitry of claim 1, wherein the isolated converter circuitry includes only one DC to DC converter stage.

4. The AC to DC power electronic converter circuitry of claim 3, wherein the isolated converter circuitry is a flyback converter.

5. The AC to DC power electronic converter circuitry of claim 4, wherein the isolated converter circuitry comprises:
   a first flyback input node, a second flyback input node, and a flyback output node;
   a flyback transformer including a primary winding coupled in series with a flyback switch between the first flyback input node and the second flyback input node and a secondary winding coupled between an anode of a flyback diode and ground, such that a cathode of the flyback diode is coupled to the flyback output node; and
   a flyback capacitor coupled between the flyback output node and ground.

6. The AC to DC power electronic converter circuitry of claim 5, wherein the flyback switch is a silicon carbide (SiC) metal-oxide-semiconductor field-effect transistor.

7. The AC to DC power electronic converter circuitry of claim 6, wherein the flyback diode is a silicon carbide (SiC) Schottky diode.

8. The AC to DC power electronic converter circuitry of claim 1, wherein the AC to DC power electronic converter circuitry has a peak efficiency less than 96%.

9. The AC to DC power electronic converter circuitry of claim 1, wherein the one or more light emitting diodes (LEDs) are in a solid-state lighting fixture.

10. The AC to DC power electronic converter circuitry of claim 1, wherein the AC to DC power electronic converter circuitry is configured to generate the DC output from an AC input signal with a voltage greater than 100V.

11. The AC to DC power electronic converter circuitry of claim 10, wherein the AC to DC power electronic converter circuitry is configured to generate the DC output from the AC input signal with a voltage less than 500 V.

12. The AC to DC power electronic converter circuitry of claim 1, wherein the AC to DC power electronic converter circuitry has a power factor greater than 0.9.

13. The AC to DC power electronic converter circuitry of claim 12, wherein the AC to DC power electronic converter circuitry has a total harmonic distortion (THD) less than 15%.

14. The AC to DC power electronic converter circuitry of claim 1, wherein the AC to DC power electronic converter circuitry has a total harmonic distortion (THD) less than 15%.

15. The AC to DC power electronic converter circuitry of claim 1, wherein the control circuitry is configured to drive the at least one of the one or more wide bandgap switching components at a frequency between 130 kHz and 500 kHz.

16. The AC to DC power electronic converter circuitry of claim 1, wherein the AC to DC power electronic converter circuitry further comprises a rectifier circuitry coupled to the isolated converter circuitry.

17. The AC to DC power electronic converter circuitry of claim 16, wherein the rectifier circuitry is a bridge rectifier.

18. A solid-state lighting fixture comprising:
   a light source including at least one light emitting diode (LED); and
   an alternating current (AC) to direct current (DC) power electronic converter circuitry comprising:
   an isolated converter circuitry including one or more wide bandgap switching components coupled to the light source; and
   a control circuitry coupled to the isolated converter circuitry and configured to drive at least one of the one or more wide bandgap switching components such that the AC to DC power electronic converter circuitry is configured to produce a driver signal for driving the at least one LED with an output power greater than 100 W at an efficiency greater than 92% and a power density between 8 W/in$^3$ and 20 W/in$^3$;
   wherein the power density is a function of the output power divided by a volume of an enclosure of the power electronic converter circuitry.

19. The solid-state lighting fixture of claim 18, wherein the one or more wide bandgap switching components are silicon carbide (SiC) components.

20. The solid-state lighting fixture of claim 19, wherein the isolated converter circuitry includes only one DC to DC converter stage.

* * * * *